United States Patent [19]
Todor

[11] Patent Number: 5,927,834
[45] Date of Patent: *Jul. 27, 1999

[54] RECEIVER AND MAGAZINE ASSEMBLY FOR STORAGE LIBRARY SYSTEM

[75] Inventor: John S. Todor, Arvada, Colo.

[73] Assignee: Storage Technology Corporation, Louisville, Colo.

[*] Notice: This patent is subject to a terminal disclaimer.

[21] Appl. No.: 09/088,517

[22] Filed: Jun. 2, 1998

Related U.S. Application Data

[63] Continuation of application No. 08/909,703, Aug. 12, 1997, Pat. No. 5,795,042.

[51] Int. Cl.[6] ............................. G11B 15/68; E05B 53/00
[52] U.S. Cl. ........................................... 312/221; 312/9.48
[58] Field of Search .................................. 312/221, 9.48, 312/222, 9.9, 9.47, 9.53, 9.57, 9.63, 9.64, 215, 319.1, 333, 216, 217; 414/331

[56] References Cited

U.S. PATENT DOCUMENTS

| | | | |
|---|---|---|---|
| 3,357,762 | 12/1967 | Forsyth | 312/215 |
| 3,904,259 | 9/1975 | Hoffmann et al. | 312/9.57 X |
| 5,607,275 | 3/1997 | Woddruff et al. | 414/331 |
| 5,673,983 | 10/1997 | Carlson et al. | 312/218 |

*Primary Examiner*—Jose V. Chen
*Assistant Examiner*—Janet M. Wilkens
*Attorney, Agent, or Firm*—Brooks & Kushman P.C.

[57] ABSTRACT

A storage library system is provided for storing cartridges having cartridge notches formed therein. The system includes a receiver forming an opening therein and includes an actuator member. A magazine is adapted for engagement within the receiver opening. The magazine includes a plurality of cells formed therein for receiving cartridges. The magazine includes a locking member engageable with the actuator member to facilitate locking member movement between locked and unlocked positions with respect to the cartridge notches for automatically locking and unlocking the cartridge in each of the plurality of cells as the magazine is moved with respect to the receiver.

1 Claim, 6 Drawing Sheets

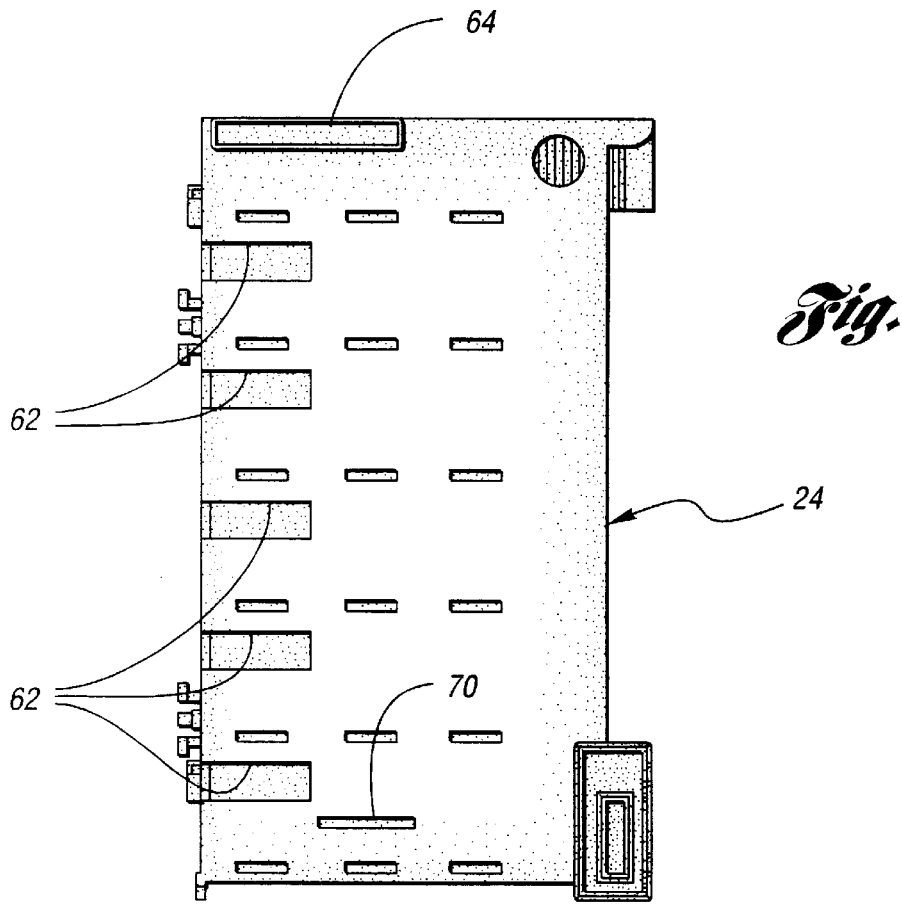
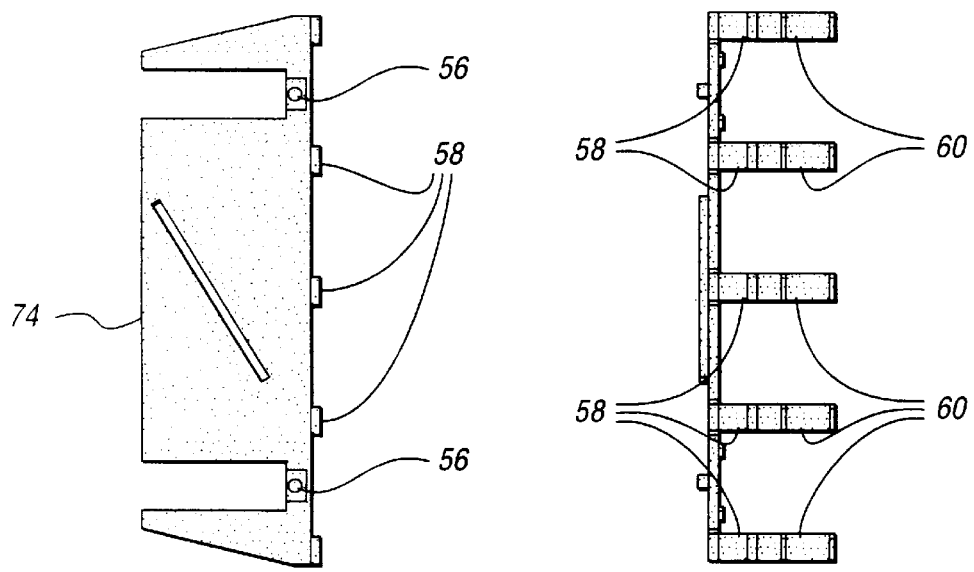

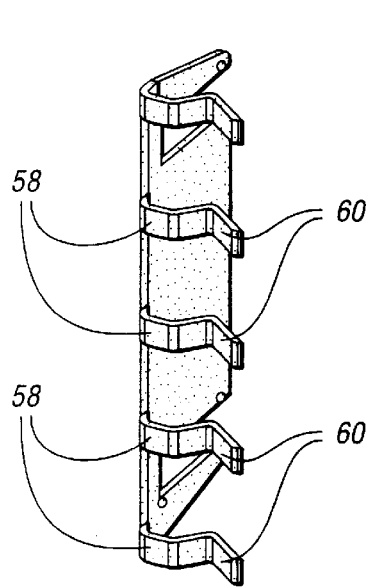
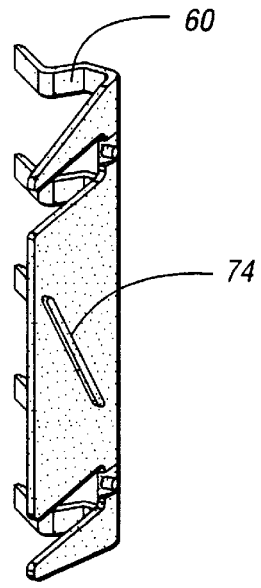
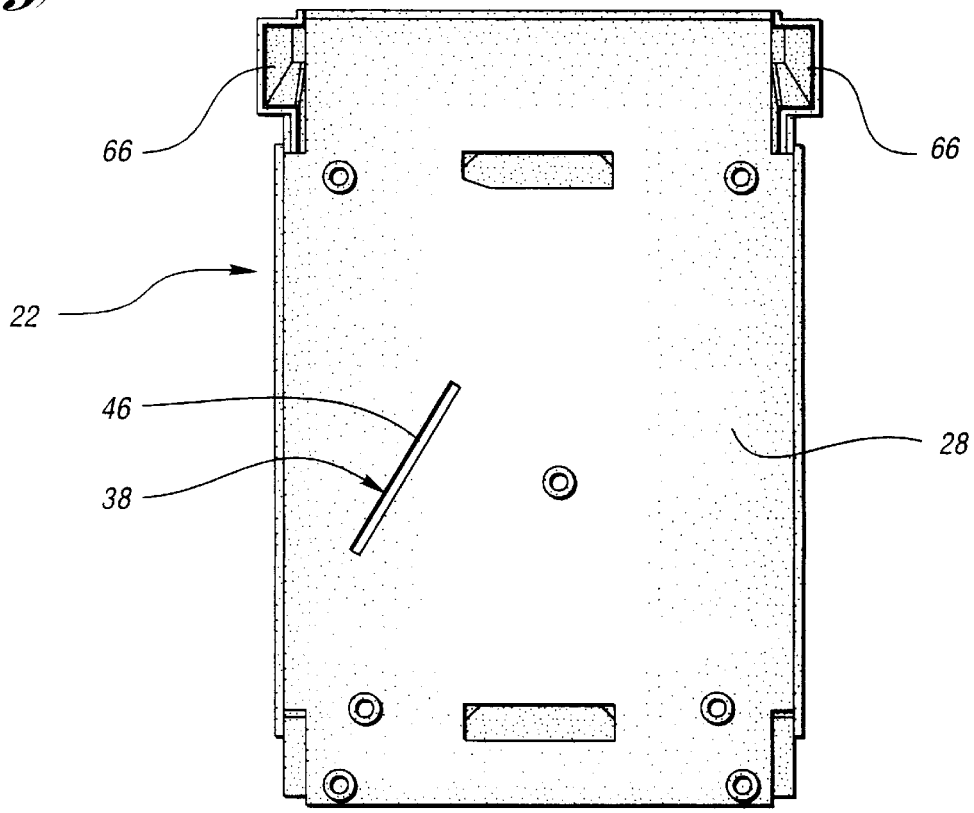

RECEIVER AND MAGAZINE ASSEMBLY FOR STORAGE LIBRARY SYSTEM

This is a continuation of application Ser. No. 08/909,703 filed on Aug. 12, 1997, now U.S. Pat. No. 5,795,042.

TECHNICAL FIELD

The present invention relates to a storage library system including a receiver adapted to receive a magazine populated with cartridges, wherein the cartridges are normally locked within the magazine when outside the receiver, and are automatically unlocked for removal from the magazine when the magazine is inserted into the receiver.

BACKGROUND OF THE INVENTION

Storage library systems are capable of storing and rapidly retrieving large quantities of information stored on storage media cartridges. Such storage library systems often use robotic mechanisms to improve the speed of information retrieval and the reliability of maintaining the storage library cartridge inventory. These robotic mechanisms typically comprise a hand mechanism positioned on a robotically movable arm. To retrieve information, the robotic arm is moved to position the hand near the inventory location of a desired media cartridge. The hand is then activated to grip the desired cartridge and remove it from the library inventory location. The robotic arm then moves to an appropriate position to further process the cartridge. In this manner, the robotic hand manipulates the cartridge for access to information stored on the cartridge.

Generally, the storage library system will include a plurality of stacks of cartridges which are accessible by means of the above-described robotic handling mechanism. Generally, the cartridges are stored within magazines having a plurality of cells formed therein for receiving the cartridges. The magazines are supported by a receiver in a manner such that the cartridges are exposed for retrieval by the robotic handling mechanism.

It is sometimes desirable to remove and install magazines as modular units in the storage library system for providing access to different types of information in groups. Accordingly, such magazines may be periodically removed from the storage library system while containing cartridges within the cells of the magazine. Accordingly, it is desirable to have the cartridges normally locked within the magazine when the cartridge is outside of the storage library system for handling, and further to have the cartridges automatically unlocked for removal from the cells as the magazine is inserted into the respective receiver.

The only known systems having removable magazines with lockable cartridge cells require flipping of a lever for locking and unlocking the cartridge cells after the magazine has been installed into the storage library system. As described above, it is desirable for the cartridge cells to be automatically unlocked as the magazine is inserted into the receiver in the storage library system.

DISCLOSURE OF THE INVENTION

Accordingly, the present invention provides a receiver and magazine assembly for a storage library system in which the cartridge cells are normally locked when the magazine is outside of the receiver, and the cartridge cells become automatically unlocked as the magazine is inserted into the respective receiver for facilitating removal of the cartridges from the various cells.

More specifically, the present invention provides a storage library system for storing cartridges having cartridge notches formed therein. The system includes a receiver forming an opening therein and including an actuator member. A magazine is adapted for engagement within the receiver opening, and includes a plurality of cells formed therein for receiving the cartridges. The magazine includes a locking member engageable with the actuator member to facilitate locking member movement between locked and unlocked positions with respect to the cartridge notches for automatically locking and unlocking the cartridge in each of the plurality of cells as the magazine is moved with respect to the receiver.

Preferably, the actuator member comprises a first rib extending from a longitudinal rear surface of the receiver and disposed at an angle with respect to the longitudinal rear surface. Preferably, the locking member includes a spring-biased, laterally slidable plate with a plurality of fingers extending therefrom for cooperation with the notch and a cartridge positioned in any of the plurality of cells. The locking member preferably further includes a second rib protruding from the plate for engaging the first rib for causing lateral sliding of the plate as the magazine is moved longitudinally with respect to the receiver for locking and unlocking of the cartridges.

Accordingly, an object of the present invention is to provide a receiver and magazine assembly for a storage library system in which the magazine cartridge cells are normally locked when the magazine is outside the receiver, and become automatically unlocked as the magazine is inserted into the receiver in order to facilitate removal of the cartridges from the magazine cells.

The above object and other objects, features, and advantages of the present invention are readily apparent from the following detailed description of the best mode for carrying out the invention when taken in connection with the accompanying drawings.

BRIEF DESCRIPTION OF THE DRAWINGS

FIG. 5 shows a side view of a magazine housing in accordance with the present invention;

FIG. 6 shows a plan view of a locking mechanism in accordance with the present invention;

FIG. 7 shows an end view of the locking mechanism of FIG. 6;

FIG. 8 shows a perspective view of the locking mechanism of FIG. 6;

FIG. 9 shows a reverse perspective view of the locking mechanism of FIG. 6; and FIG. 10 shows a plan view of a receiver in accordance with the present invention.

DETAILED DESCRIPTION OF THE PREFERRED EMBODIMENT

Figure 1:
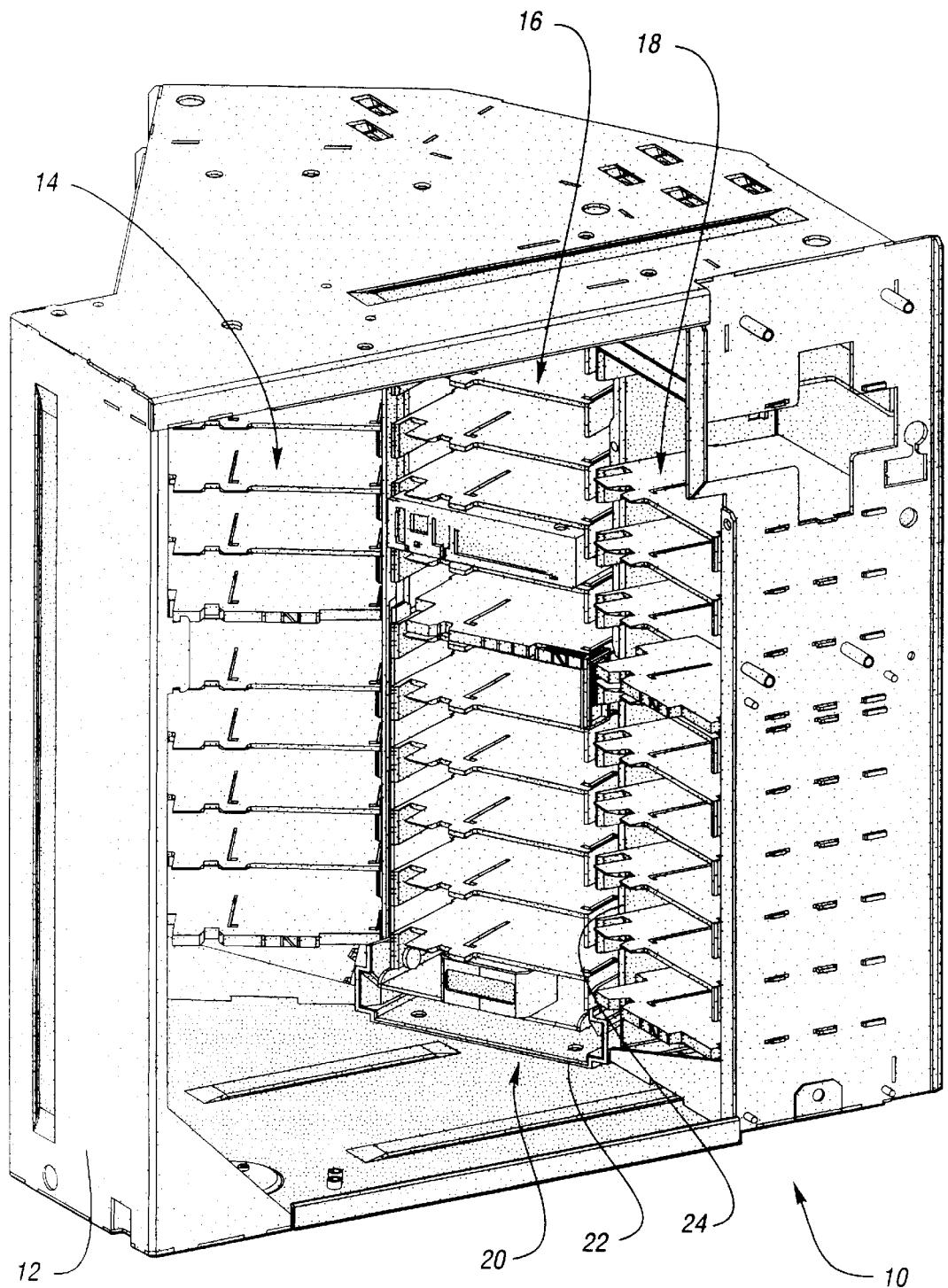
FIG. 1 shows a perspective view of a storage library system in accordance with the present invention.

Referring to FIG. 1, a storage library system 10 is shown in accordance with the present invention. As shown, the storage library system 10 includes an outer housing 12 which encloses a plurality of cartridge cell stacks 14, 16, 18, which are configured for storing stacks of cartridges therein. At least one of the cartridge cell stacks 14, 16, 18 comprises a receiver and magazine assembly 20. The receiver and magazine assembly 20 comprises a receiver 22 adapted to removably receive a cartridge magazine 24.

Figure 2:
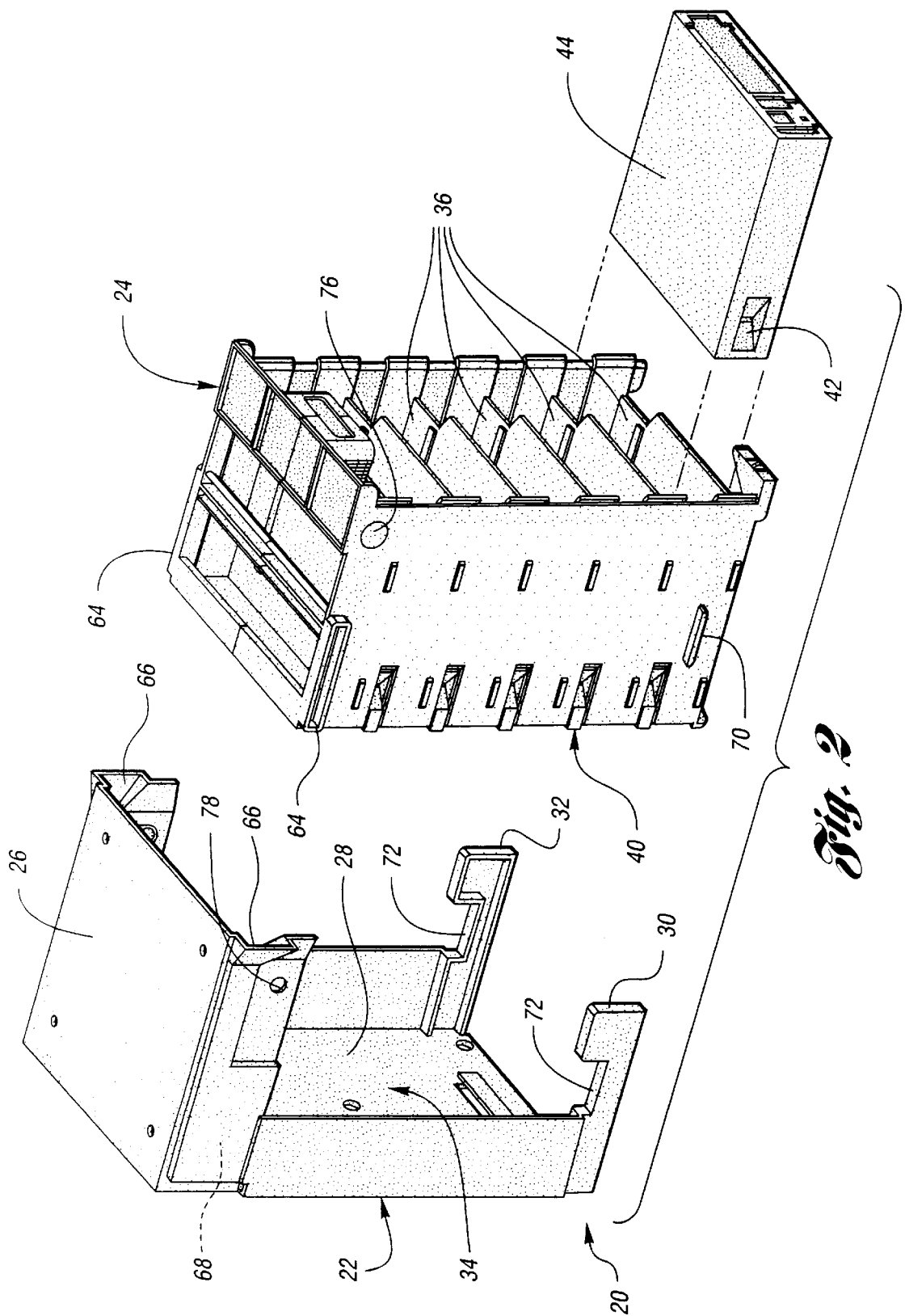
FIG. 2 shows a partially exploded perspective view of a receiver and magazine assembly in accordance with the present invention.
Figure 3:
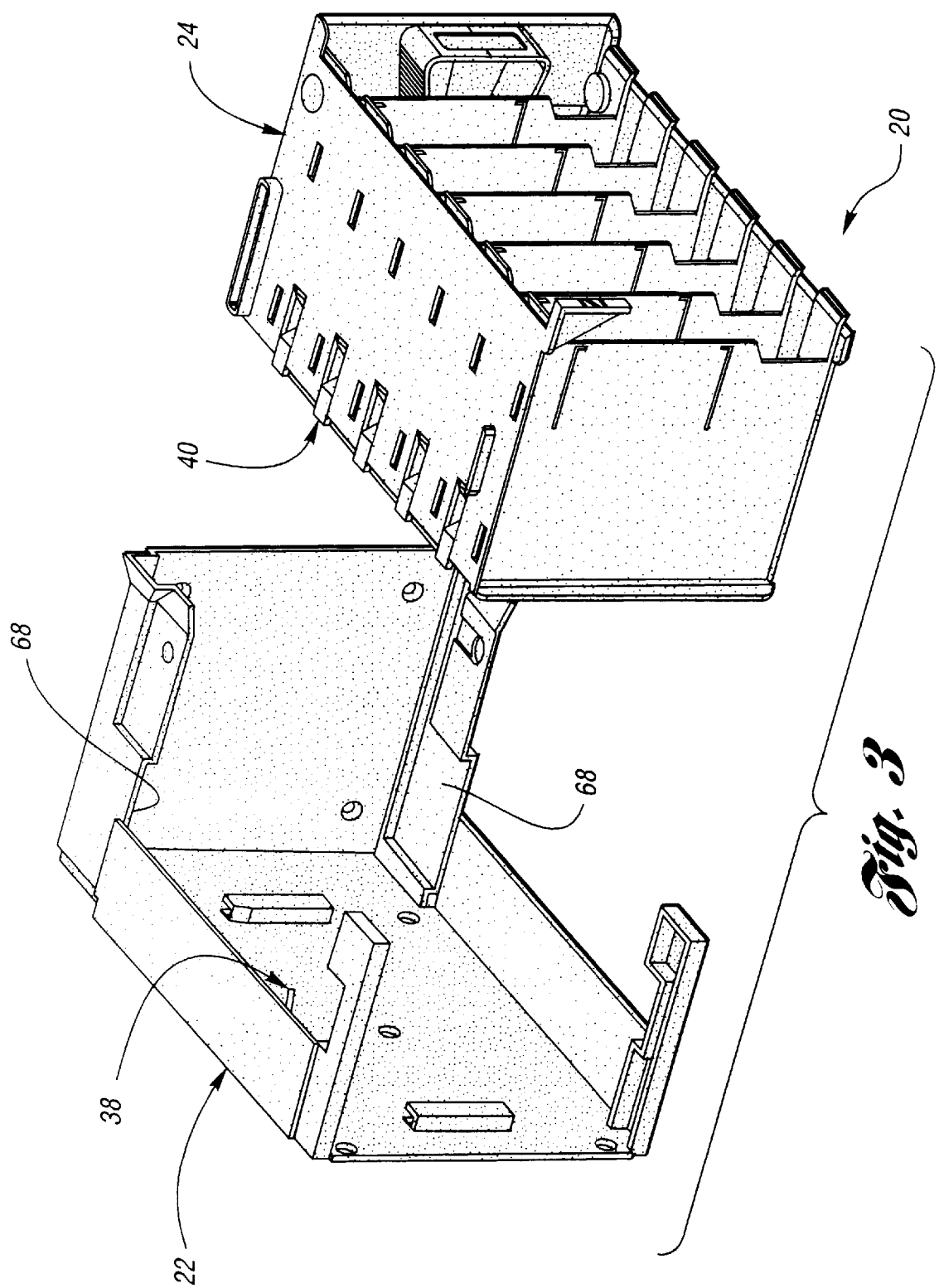
FIG. 3 shows a reverse partially exploded perspective view of the receiver and magazine assembly of FIG. 2.
Figure 4:
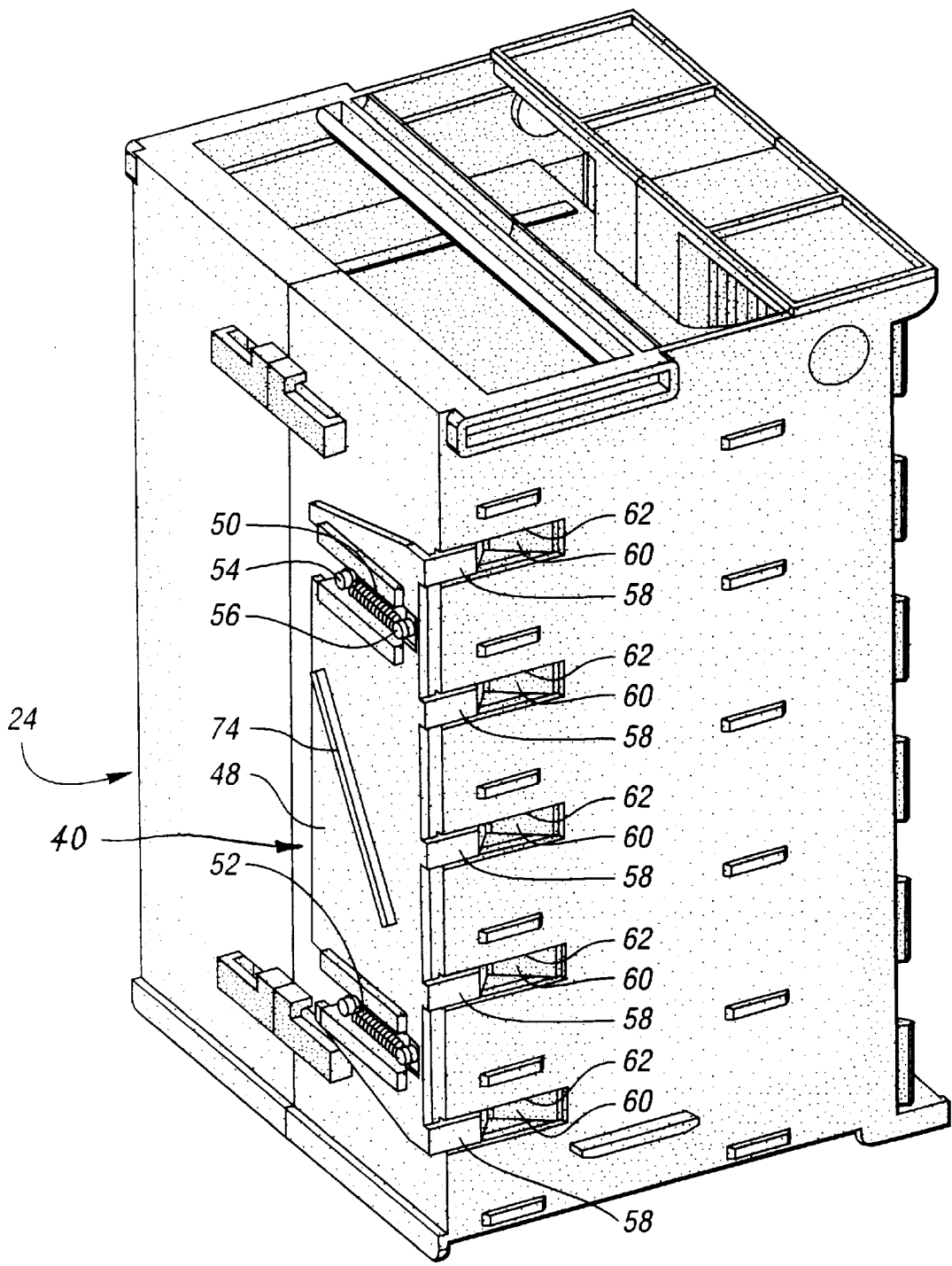
FIG. 4 shows a rear perspective view of a magazine in accordance with the present invention.

The receiver and magazine assembly 20 is more clearly shown in FIGS. 2 and 3. As shown, the receiver 22 includes a top portion 26, a rear surface 28, and lower legs 30,32, all of which cooperate to form an opening 34 for receiving the magazine 24.

The magazine 24 includes a plurality of cells 36 formed therein for receiving cartridges. Preferably, five (5) cells are provided.

Still referring to FIGS. 2 and 3, the receiver 22 is provided with an actuator member 38 (most clearly shown in FIG. 10), and the magazine 24 is provided with a locking member 40 which is engageable with the actuator member 38 to facilitate locking member movement between locked and unlocked positions with respect to the cartridge notches, such as notch 42 of the cartridge 44. In this manner, the cartridge 44 may be automatically locked and unlocked from the cells 36 as the magazine 24 is moved with respect to the receiver 22 for engaging the actuator member 38 and locking member 40 (the operation of which is described below).

As shown in FIG. 10, the actuator member 38 comprises a first rib 46 extending from the rear surface 28 of the receiver 22, and disposed at an angle with respect to the longitudinally extending rear surface 28.

As most clearly shown in FIGS. 4–9, the locking member 40 comprises a spring-biased, laterally slidable plate 48. The plate 48 is spring-biased with respect to the magazine 24 by means of the springs 50,52, which extend between the bosses 54,56. The locking member 40 also includes a plurality of fingers 58 extending from the plate 48. The fingers 58 each include a bent portion 60 for extending through the opening 62 corresponding with each cell for allowing the bent portion 60 to pass through and cooperate with the notch 42 in the respective cartridge 44 for locking the cartridge in the cell 36.

When the magazine 24 is not disposed within the receiver 22, the springs 50,52 bias the locking member 40 to a closed position, wherein the bent portions 60 of the fingers 58 cooperate with the notch 42 in each cartridge 44 for securing the cartridge in the respective cell 36. When the magazine 24 is inserted into the receiver 22, the actuator member 38 and locking member 40 are operative to disengage the fingers 58 from the respective cartridge notch 42 for unlocking the cartridges for access. This operation is described below.

The magazine 24 includes a guide track 64 positioned at opposing sides of a longitudinal end of the magazine 24. The receiver 22 provides a corresponding guide channel 66 positioned at opposing sides of a longitudinal end thereof for receipt of the respective guide tracks 64. As the magazine 24 is inserted into the opening 34 in the receiver 22, the guide tracks 64 travel into the guide channel 66 and the magazine 24 is then moved longitudinally with respect to the receiver 22 for sliding the guide tracks 64 in the longitudinal slot 68, most clearly shown in FIG. 3. The magazine 24 is then moved fully longitudinally with respect to the receiver 22 until the tabs 70 bottom out in the slots 72 formed in the lower arms 30,32 of the receiver 22.

For automatically unlocking the locking member 40, the locking member 40 is provided with a second rib 74 protruding from the plate 48 for engaging the first rib 46 on the rear surface 28 of the receiver 22. The angled ribs 46,74 engage each other while the magazine 24 is moved longitudinally with respect to the receiver 22, and the plate 48 is caused to slide laterally for moving the bent portions 60 of the fingers 58 out of the openings 62 formed in the magazine 24 for disengaging the bent portions 60 of the fingers 58 from the respective cartridge notches 42 for disengaging the cartridges automatically such that the cartridges 44 may be easily slid out of the respective cells 36.

As shown in FIG. 2, the magazine 24 is also provided with an indicator button 76 which cooperates with the aperture 78 formed in the receiver 22 when the magazine 24 has been fully engaged to a secured position within the receiver 22 in which the tabs 70 are engaged within the slots 72, and the guide track 64 has traveled fully to the bottom of the longitudinal slot 68 on each side of the receiver 22. The indicator button 76 is visible to the user in order to indicate that the locking member 40 has been disengaged, and the cartridges 44 may be freely removed from the cartridge cells 36 of the magazine 24.

Returning to FIG. 4, the spring-bias provided by the springs 50,52 also cause the locking plate 48 to return to the locked position as the magazine 24 is moved vertically with respect to the receiver 22 for removing the magazine 24 from the receiver 22, thereby automatically locking any cartridges within the magazine cartridge cells as the magazine is removed from the receiver 22.

While the best mode for carrying out the invention has been described in detail, those familiar with the art to which this invention relates will recognize various alternative designs and embodiments for practicing the invention within the scope of the appended claims.

What is claimed is:

1. A storage library system for storing cartridges, each cartridge having at least one notch formed therein, the system comprising:

a receiver forming an opening therein and including an actuator member; and a magazine adapted for engagement within the receiver opening and having a plurality of cells formed therein for receiving the cartridges, wherein the magazine includes a locking member engageable with the actuator member to facilitate locking member movement between locked and unlocked positions with respect to the cartridge notches for automatically locking and unlocking the cartridges in each of the plurality of cells as the magazine is moved with respect to the receiver.

* * * * *